(12) United States Patent
Christiansen

(10) Patent No.: US 8,033,809 B2
(45) Date of Patent: Oct. 11, 2011

(54) MACHINE FOR FORMING CONTAINERS

(75) Inventor: Peter Christiansen, Hamburg (DE)

(73) Assignee: Krones AG, Neutraubling (DE)

( * ) Notice: Subject to any disclaimer, the term of this patent is extended or adjusted under 35 U.S.C. 154(b) by 463 days.

(21) Appl. No.: 12/251,573

(22) Filed: Oct. 15, 2008

(65) Prior Publication Data
US 2009/0104304 A1    Apr. 23, 2009

(30) Foreign Application Priority Data

Oct. 19, 2007   (DE) .......................... 10 2007 050 479

(51) Int. Cl.
*B29C 49/68*   (2006.01)
*B29C 49/42*   (2006.01)
*B29C 31/08*   (2006.01)

(52) U.S. Cl. ......... 425/182; 425/526; 425/534; 425/540
(58) Field of Classification Search .................. 425/182, 425/526, 534, 540
See application file for complete search history.

(56) References Cited

U.S. PATENT DOCUMENTS

| | | | | |
|---|---|---|---|---|
| 3,995,990 A | * | 12/1976 | Dwyer et al. | 432/121 |
| 4,050,887 A | * | 9/1977 | Berggren et al. | 432/122 |
| 4,092,097 A | * | 5/1978 | Appel et al. | 432/11 |
| 4,147,011 A | * | 4/1979 | Kronseder et al. | 53/136.1 |
| 6,386,857 B1 | * | 5/2002 | Nava | 425/526 |
| 2004/0009252 A1 | * | 1/2004 | Reichstein et al. | 425/143 |
| 2009/0061041 A1 | * | 3/2009 | Kiefl | 425/534 |

FOREIGN PATENT DOCUMENTS

DE    19906438 A1 *  8/2000

* cited by examiner

*Primary Examiner* — Robert B Davis
(74) *Attorney, Agent, or Firm* — Marshall, Gerstein & Borun LLP

(57) ABSTRACT

A machine for forming containers having a blowing module containing a drivable rotor, a heating module containing a drivable conveyor and feeding the blowing module, and a main drive which is associated with both the blowing and heating modules and which is adapted to be selectively operated either in a continuous mode or in a clocked mode. A power train includes a decoupling unit which is arranged between the rotor and the conveyor and which is selectively actuable, and an auxiliary drive, which can be switched on selectively, is provided for the power train component that is separated from the main drive in the actuated condition of the decoupling unit.

12 Claims, 2 Drawing Sheets

MACHINE FOR FORMING CONTAINERS

CROSS-REFERENCE TO RELATED APPLICATION

The present application claims the benefit of priority of German Patent Application No. 102007050479.0, filed Oct. 19, 2007. The entire text of the priority application is incorporated herein by reference in its entirety.

FIELD OF THE DISCLOSURE

The present disclosure relates to a machine for forming continuous-blown or stretch-blown containers.

BACKGROUND

In the case of such machines, which are known in practice (e.g. Contiform of the firm of Krones AG), the rotor of the blowing module and the conveyor of the heating module are driven in common through a main drive which is normally associated with the blowing module, since the blowing module has higher power requirements. When setting or retooling the machine, or when a failure occurred either in the heating module or in the blowing module, work has to be done in a clocked mode in the blowing module and/or in the heating module. During retooling or setting operations it will, for example, be necessary to exchange or convert molds in the blowing module and to exchange fittings, such as preform grippers, shielding plates and the like, in the heating module. In the course of such operations, the rotor in the blowing module will often have to be positioned at locations which are different from those of the conveyor in the heating module. This is one of the reasons for the fact that such work at the blowing module and at the heating module is carried out with a time shift, since, in view of the necessity of positioning the respective components at different locations, the operators would otherwise impede one another. In addition, the operational risk would be high, if the operators worked simultaneously at both modules and if they mutually endangered one another during the respective stepwise advance. Another drawback of the known principle is to be seen in the fact that, if a malfunction should, for example, occur in a further unit supplied by the blowing module, e.g. a blockage in a downstream filler, both the rotor in the blowing module and the conveyor in the heating module will have to be stopped until the blockage has been eliminated. The preforms in the heating module may be damaged when the conveyor stands still so that, subsequently, time-consuming resetting operations will become necessary. In addition, the main drive will unnecessarily waste power in the clocked mode of operation, when said main drive also moves the conveyor while work is being done in the blowing module or when the main drive also drives the rotor while work is being done in the heating module. The most serious drawback is, however, that the setting or retooling periods and, consequently, the downtimes of the machine are, in total, inexpediently long.

SUMMARY OF THE DISCLOSURE

It is the object of the present disclosure to improve a machine of the type referred to at the beginning in such a way that changeover times, e.g. during setting or retooling operations, are reduced while maintaining a high operating reliability and safety.

During normal operation, the main drive is still responsible for moving the rotor and the conveyor as long as the decoupling unit is not actuated. During setting or retooling operations, however, the decoupling unit can be actuated, if necessary, so as to separate the power train components from one another. When the decoupling unit has been actuated, the main drive will drive the rotor, whereas the auxiliary drive will then drive the conveyor. Operators can simultaneously work at the blowing module as well as at the heating module so that changeover processes, in which e.g. heating module fittings and blowing module fittings are exchanged, can be carried out simultaneously and independently of one another. The result is that changeover times can be reduced substantially. According to a particularly expedient embodiment, the conveyor located in the heating module and driven by the auxiliary drive can be charged by at least one changer which, if necessary, cooperates with the auxiliary drive independently of whether or not the rotor in the blowing module is driven at the time in question. In addition, power will be saved, since, in the actuated condition of the decoupling unit, the main drive only has to drive the rotor in the blowing module, whereas the auxiliary drive can be configured as a comparatively low-powered drive for the conveyor, which can be moved with comparatively little power expenditure. The safety standard is high, since, although work is simultaneously done at the blowing module and at the heating module, the operational risks for the respective operator are low. If a malfunction should occur e.g. in a unit arranged downstream of the blowing module, the blowing module can be stopped, while, in the then actuated condition of the decoupling unit, the conveyor is still driven so as to prevent the preforms from being damaged in the heating module.

According to an expedient embodiment, the main drive is associated with the blowing module that has higher power requirements, whereas the auxiliary drive is only associated with the heating module for which a lower driving power will suffice, said auxiliary drive being arranged close to the decoupling unit in an expedient manner. The auxiliary drive need not necessarily be arranged directly at or close to the decoupling unit, but it may also be arranged at a suitable location of the heating module in such a way that it can selectively be coupled to the conveyor as soon a the decoupling unit has been actuated and the power train components have been separated.

The decoupling unit can be implemented with conventional means so as to allow the power train components to be separated from one another and the auxiliary drive to be coupled. It will be expedient to provide two alternately actuable clutches, the first connecting the power train components to one another and the second decoupling the auxiliary drive, or the second coupling the auxiliary drive and the first separating the power train components. Alternatively, a single clutch would suffice to either couple the power train components to one another or separate them from one another, a freewheel being then provided between the auxiliary drive and the conveyor. In a condition in which the auxiliary drive is switched off and the power train components are connected, the auxiliary drive is overrun, whereas the freewheel will couple the auxiliary drive to the conveyor, when the auxiliary drive is switched on and when the single clutch is actuated such that the power train components are separated.

In order to achieve short switching times and a high operating reliability, the respective clutch can be operable pneumatically, hydraulically, electromagnetically. For simple embodiments also the use of mechanically actuable clutches will be expedient.

The auxiliary drive comprises an electric motor or a hydro motor which can preferably be combined with a gearbox.

The auxiliary drive can expediently be driven in a continuous mode or in a clocked mode.

According to a preferred embodiment, a drive shaft for a drive wheel of the conveyor is provided in the decoupling unit, said drive shaft being connected to the main drive. The auxiliary drive is also associated with the drive wheel. One clutch is arranged between the drive wheel and the drive shaft, whereas the other clutch is arranged between the auxiliary drive and the drive wheel. By alternately engaging and disengaging the clutches, the power train components are either connected to one another or separated from one another, and the auxiliary drive is switched on or decouple Alternatively, the only clutch can be arranged between the drive wheel and the drive shaft, whereas the freewheel is arranged between the auxiliary drive and the drive wheel. The freewheel is expediently implemented such that it is effective in the direction of movement in which the auxiliary drive has to drive the conveyor.

In order to allow setting or retooling operations to be carried out without delay, it can be expedient to actuate the decoupling unit from the side of by the blowing module and/or from the side of the heating module or by means of a central control unit.

In particular for the auxiliary drive, it may be expedient to provide a portable control unit which the respective operator can take with him to the location at which he has to work on the heating module. The control unit can be wired or, and this is even more expedient, it can operate in a wireless mode.

According to an expedient embodiment, the heating module or the conveyor thereof has associated therewith at least one changer for changing fittings of the conveyor. The changer is operable for automatically changing the fittings in correlation with the operation of the auxiliary drive. If desired, the auxiliary drive can even be used as a drive source for the changer. In this case, decoupling by means of two clutches can be expedient so that the conveyor can be driven in the forward and/or the reverse direction and so that a very precise and fast positioning at the respective location required for the changer will be possible.

According to a concrete embodiment, the conveyor of the heating module is provided with a mandrel chain for preform grippers. In the actuated condition of the decoupling unit, the mandrel chain is adapted to be driven by the auxiliary drive in a clocked inching mode so that an operator will be able to move the mandrel chain to the respective correct position required for executing a change in the heating module, irrespectively of the position to which the rotor in the blowing module has to be moved at the time in question.

Finally, an expedient embodiment is so conceived that the auxiliary drive is adapted to be driven in both directions of rotation so that position corrections in the heating module can be carried out more easily.

BRIEF DESCRIPTION OF THE DRAWINGS

Embodiments of the subject matter of the present disclosure will be explained making reference to the drawings, in which.

DETAILED DESCRIPTION OF THE PREFERRED EMBODIMENT

Figure 1:
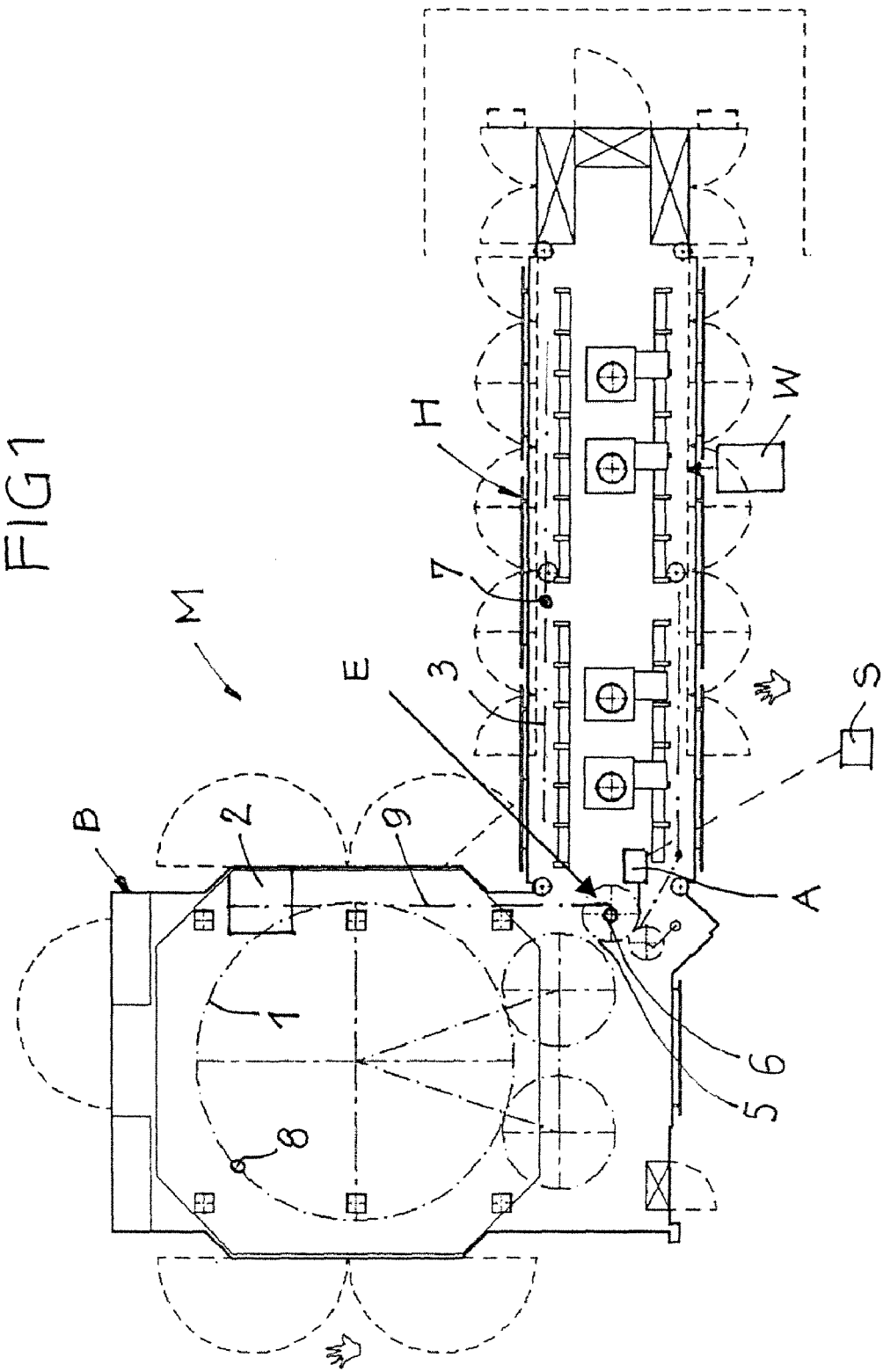
FIG. 1 shows a schematic top view of a machine for forming containers.

FIG. 1 shows a schematic top view of a machine M for forming containers, e.g. a blow moulding machine for continuously blowing or stretch blowing plastic bottles from plastic preforms. In the embodiment shown, a blowing module B is functionally coupled to the heating module H, said heating module H supplying to the blowing module B preforms which have been subjected to a temperature treatment (heating/cooling); these preforms are blown so as to form containers in said blowing module B and are then supplied, if desired, to a unit for further processing. It would be possible to combine more than one blowing module B with a heating module H, or a plurality of heating modules H with a blowing module B.

The blowing module B contains a rotor 1 which is adapted to be driven by a main drive 2 either permanently or in a clocked mode of operation. The rotor 1 carries as fittings e.g. blow moulds 8. The heating module H implemented as an elongate station and attached to the blowing module B contains a conveyor 3, e.g. a mandrel chain for preform grippers as fittings 7.

The main drive 2 drives via a power train component 9 (e.g. a gear mechanism) the rotor 1 and via an initially non-actuated decoupling unit E a power train component 10 of the conveyor 3. The decoupling unit E is switchable so as to either couple the power train components 9, 10 to one another or separate them from one another. During normal operation (continuous operation), the decoupling unit E is not actuated, and the main drive 2 drives both the rotor 1 and the conveyor 3. When this is the case, rotated preforms are thermally treated on the fittings in the heating module H by means of the conveyor 3, i.e. they are moved through heating and/or cooling stations before they are transferred into the blowing module B.

In the heating module H, an auxiliary drive A is provided, expediently close to decoupling unit E, said auxiliary drive A being adapted to be coupled to the conveyor 3 in the actuated condition of the decoupling unit E. The auxiliary drive A may also be positioned at some other suitable location of the heating module H. The actuation and/or a clocked mode of operation or an inching operation of the auxiliary drive A can be executed e.g. via a portable control unit S, which is wired or which operates in a wireless mode.

In the embodiment shown, the power train component 9 drives from the side of the main drive 2 a drive shaft 6 by means of which a drive wheel 5 for the conveyor 3 can be driven. The heating module H and the conveyor 3 can have associated therewith a fittings changer W which automatically exchanges the fittings 7 when the conveyor 3 is operated in a clocked mode by means of the auxiliary drive A.

The decoupling unit E cannot only be actuated for the purpose of allowing operations in the blowing module B and in the heating module H to be executed simultaneously and independently of one another, but it can also be actuated if it should be necessary to stop the operation of the blowing module B, the conveyor 3 of the heating module H being then still driven by the auxiliary drive A.

Figure 2:
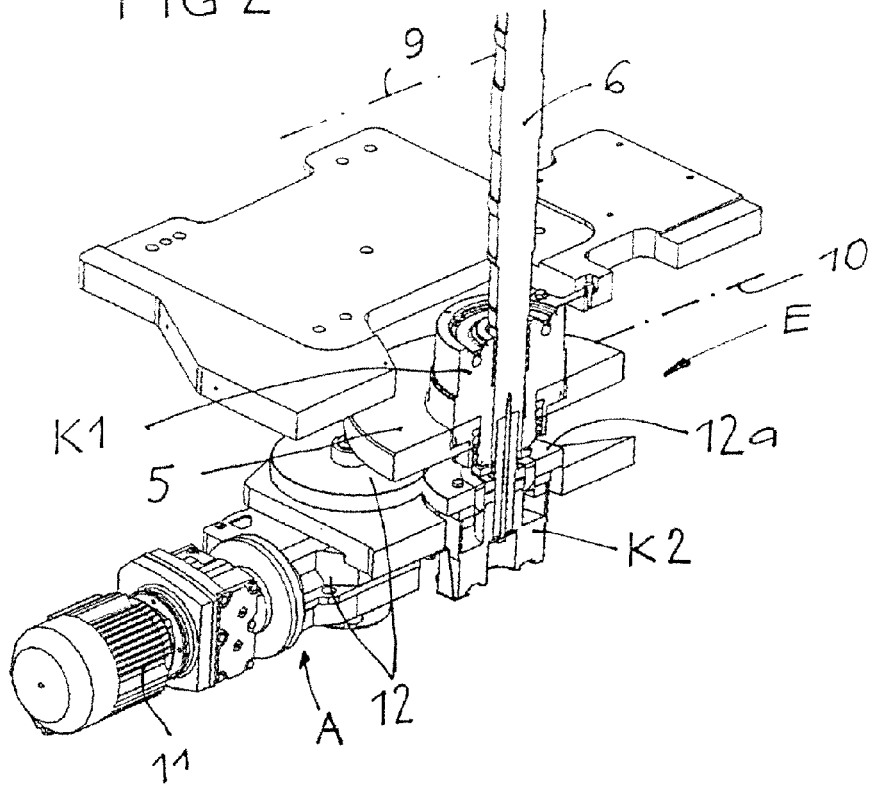
FIG. 2 shows a perspective sectional view of a first embodiment of a decoupling unit of the type provided in the machine according to FIG. 1.
Figure 3:
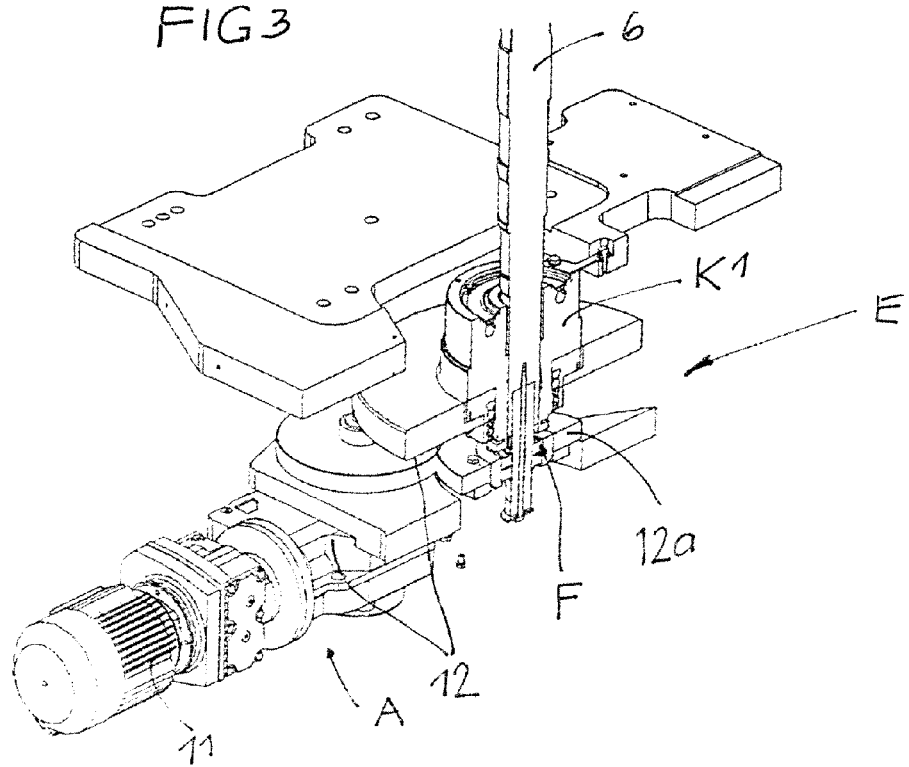
FIG. 3 shows a perspective sectional view of a second embodiment of a decoupling unit.

FIGS. 2 and 3 illustrate two different embodiments of the actuable decoupling unit E. It will be expedient to implement the decoupling unit E such that it can be actuated either from the side of the blowing module B or from the side of the heating module H, or selectively from both sides, or alternatively or additively also by a central control unit (not shown). It would be possible to automatically actuate the decoupling unit E and switch on the auxiliary drive A in response to an emergency stop caused e.g. in the blowing module B or in a unit connected downstream of said blowing module B.

In the embodiment of the decoupling unit shown in FIG. 2, the power train component 9 drives from the side of the main drive 2 a drive shaft 6 which extends through a drive wheel 5 for the conveyor 3 (power train component 10) coaxially therewith. A first clutch K1 is provided between the drive wheel 5 and the drive shaft 6, said clutch K1 being operable pneumatically, hydraulically, electromagnetically or mechanically between an engaged condition and a disengaged condition.

A lower end of the drive shaft 6 has associated therewith the auxiliary drive A which comprises an electric motor or a hydro motor 11 and, expediently, a gearbox 12, a pinion 12a of said gearbox 12 receiving therein the lower end of the drive shaft 6. The pinion 12a and the drive wheel 5 have provided between them a further clutch K2 whose function can correspond to that of the clutch K1. The two clutches K1 and K2 can be actuated alternately, i.e. when the clutch K1 is engaged the clutch K2 is disengaged and vice versa.

When the clutch K1 is disengaged, the power train components 9 and 10 are separated from one another. The clutch K2, which is engaged in this condition, connects the auxiliary drive A to the drive wheel 5 and thus to the power train component 10. When the first clutch K1 is engaged, the other clutch K2 is disengaged and the power train components 9, 10 are coupled.

In the embodiment according to FIG. 3, a single clutch K1 is provided between the drive wheel 5 and the drive shaft 6, said clutch K1 being adapted to be switched between an engaged condition and a disengaged condition so as to selectively couple the power train components 9, 10 to one another or separate them from one another. The pinion 12a of the gearbox 12 of the auxiliary drive A and the drive wheel 5 have provided between them a freewheel F which allows the drive shaft 6 to rotate when the clutch K1 is engaged and when the auxiliary drive A is standing still, whereas, in the disengaged condition of the clutch K1, it couples the auxiliary drive A to the drive wheel 5. Alternatively, the power train component 9 could be connected to the drive shaft 6 and the drive wheel 5 could be connected to the conveyor 3.

According to an alternative embodiment, which is not shown, the freewheel F according to FIG. 3 could also be integrated in the gearbox 12 of the auxiliary drive A. According to a further alternative which is not shown, the auxiliary drive A could include a controllable or variable hydro motor 11 which is coupled to the drive shaft 6 via only one gearing stage and which is entrained when the single clutch K1 is engaged, the hydro motor being then adjusted such that it operates with low or zero resistance.

In the case of the variant including an auxiliary drive A which is directly coupled to the drive shaft 6, it is also imaginable to provide a clutch K1 or a freewheel F between the drive shaft 6 and the auxiliary drive A. Another imaginable embodiment is implemented such that the clutch K1 or the freewheel F is accommodated in the motor unit or the gearbox unit.

In the actuated condition of the decoupling unit E, the conveyor 3 can be driven in a clocked mode of operation; this clocked mode of operation can be correlated with the operation of the at least one fittings changer W. Where necessary, the auxiliary drive A is even used for driving the changer.

Fittings that undergo a change in the rotor 1 of the blowing module B could be blow molds or parts thereof. Fittings 7 that undergo a change in the conveyor 3 could, however, be preform grippers and/or shielding plates. The separation of the power train components 9, 10 in the actuated condition of the decoupling unit E offers the advantage that a positioning at different locations in the blowing module B and in the heating module H is possible in the case of simultaneously executed changeover operations and that these positions can be selected independently of one another as well as that also the downtimes at the respective positions can be chosen in a completely independent manner and according to requirements. Another advantage of the auxiliary drive A is that the conveyor 3 can continue to operate when the blowing module B has been stopped, so as to prevent the preforms from being damaged.

I claim:

1. A machine for forming containers, comprising at least one blowing module containing a drivable rotor, at least one heating module-containing a drivable conveyor conveying performs through the heating module and feeding the blowing module with heated pre-forms, a main drive which is arranged in a power train of both the blowing and the heating modules and which is selectively operable in one of a continuous mode or in a clocked mode, the power train including a decoupling unit which is arranged between power train components respectively associated with the rotor and the conveyor and which is selectively actuable for separating the power train components, and an auxiliary drive associated with the heating module for a drive train component of the conveyor contained in the heating module which can be switched on selectively provided for the power train component that is separated from the main drive in the actuated condition of the decoupling unit, wherein the auxiliary drive is operable in one of a clocked or an inching mode during one of a settling or a tooling operation carried out in the heating module, and wherein the auxiliary drive is selectively operable in the clocked or inching mode for driving the drive train component when separated from the main drive in an actuated condition of the decoupling unit.

2. A machine according to claim 1, wherein the respective clutch can be operated one of pneumatically, hydraulically, electromagnetically or mechanically.

3. A machine according to claim 1, wherein the auxiliary drive comprises one of an electric motor or hydro motor.

4. A machine according to claim 1, the auxiliary drive can be operated in one of a continuous mode, the clocked mode, or the inching mode.

5. A machine according to claim 1, wherein in the decoupling unit, a drive shaft is provided for a drive wheel of the conveyor contained in the heating module, the drive shaft being adapted to be driven by the power train component connected to the main drive, wherein the auxiliary drive is connected to the drive wheel, and wherein a first clutch is arranged between the drive wheel and the drive shaft and one of a second clutch or a free wheel is arranged between the auxiliary drive and the drive wheel.

6. A machine according to claim 1, wherein in the decoupling unit, a drive shaft is provided for a drive wheel of the conveyor contained in the heating module, said drive shaft being adapted to be driven by the power train component connected to the main drive, wherein the auxiliary drive is connected to the drive shaft, and wherein a clutch is arranged between the power train component and the drive shaft.

7. A machine according to claim 1, wherein the decoupling unit is adapted to be actuated by one of from a side of the blowing module, from a side of the heating module, or by means of a central control unit.

8. A machine according to claim 1, wherein the auxiliary drive can be operated in the clocked or inching mode by one of a portable, wired or wireless control unit.

9. A machine according to claim 1, wherein the heating module has associated therewith at least one changer for changing fittings carried by the conveyor contained in the heating module, wherein the conveyor is provided with a mandrel chain for at least one of pre-formed grippers and shielding plates as said exchangeable fittings, and wherein the changer is operable for automatically changing the exchangeable fittings in correlation with the clocked or inching mode operation of the auxiliary drive.

10. A machine according to claim 1, wherein the auxiliary drive selectively in both directions of rotation.

11. A machine according to claim 3, wherein the auxiliary drive includes a gearbox.

12. A machine for forming containers, comprising at least one blowing module containing a drivable rotor, at least one heating module containing a drivable conveyor and feeding the blowing module, a main drive which is arranged in a power train of both the blowing and the heating modules and which is selectively operable in one of a continuous mode or in a clocked mode, the power train including a decoupling unit which is arranged between power train components respectively associated with the rotor and the conveyor and which is selectively actuable for separating the power train components, and an auxiliary drive which can be switched on selectively for the power train component that is separated from the main drive in the actuated condition of the decoupling unit, wherein the auxiliary drive can be driven selectively in both directions of rotation.

* * * * *